United States Patent
Bryant et al.

(10) Patent No.: US 11,098,568 B2
(45) Date of Patent: Aug. 24, 2021

(54) RESERVOIR STIMULATION METHOD AND SYSTEM

(71) Applicant: STATOIL GULF SERVICES LLC, Houston, TX (US)

(72) Inventors: Jason Bryant, Spring, TX (US); Auristela Carolina Vasquez Quintero, Austin, TX (US)

(73) Assignee: STATOIL GULF SERVICES LLC, Houston, TX (US)

( * ) Notice: Subject to any disclaimer, the term of this patent is extended or adjusted under 35 U.S.C. 154(b) by 16 days.

(21) Appl. No.: 15/712,899

(22) Filed: Sep. 22, 2017

(65) Prior Publication Data

US 2019/0093465 A1 Mar. 28, 2019

(51) Int. Cl.
*E21B 43/267* (2006.01)
*C09K 8/80* (2006.01)
*C09K 8/68* (2006.01)
*E21B 43/30* (2006.01)
*C09K 8/66* (2006.01)

(52) U.S. Cl.
CPC .............. *E21B 43/267* (2013.01); *C09K 8/66* (2013.01); *C09K 8/68* (2013.01); *C09K 8/80* (2013.01); *E21B 43/305* (2013.01)

(58) Field of Classification Search
CPC ....... E21B 43/267; E21B 43/305; C09K 8/68; C09K 8/80
See application file for complete search history.

(56) References Cited

U.S. PATENT DOCUMENTS

| | | | | |
|---|---|---|---|---|
| 3,224,506 A * | 12/1965 | Huitt | ..................... | E21B 43/267 166/223 |
| 3,225,828 A * | 12/1965 | Wisenbaker | ............ | E21B 29/00 166/298 |
| 4,119,151 A * | 10/1978 | Smith | ................... | E21B 10/322 166/298 |
| 4,187,185 A * | 2/1980 | Park | ....................... | C09K 8/584 166/272.4 |
| 5,197,543 A * | 3/1993 | Coulter | ................... | E21B 33/13 166/281 |
| 5,398,763 A * | 3/1995 | Watson | ................... | E21B 23/02 166/162 |
| 6,084,009 A * | 7/2000 | Mizoguchi | ......... | C09D 133/068 523/201 |
| 7,621,328 B1 * | 11/2009 | Case | ..................... | E21B 21/062 166/279 |
| 8,469,089 B2 * | 6/2013 | Maier | .................... | E21B 33/128 137/493.1 |
| 2006/0243443 A1 * | 11/2006 | Matthews | ............... | E21B 43/11 166/297 |

(Continued)

*Primary Examiner* — Aaron L Lembo
(74) *Attorney, Agent, or Firm* — Birch, Stewart, Kolasch & Birch, LLP

(57) ABSTRACT

A method of stimulating a formation containing two or more wellbores includes simultaneously stimulating a first region of each wellbore using a stimulation fluid so as to create a primary fracture in the first region of each wellbore, wherein the first region comprises a first opening or openings allowing fluid communication between each wellbore and the formation, wherein the first region has a first stimulated lateral length and wherein the flow rate of the stimulation fluid through the first opening or openings is greater than 1 barrel per minute per foot of the first stimulated lateral length.

33 Claims, 6 Drawing Sheets

(56) References Cited

U.S. PATENT DOCUMENTS

| | | | |
|---|---|---|---|
| 2009/0288833 A1* | 11/2009 | Graham | E21B 7/046 |
| | | | 166/306 |
| 2013/0032347 A1* | 2/2013 | Parker | E21B 43/11 |
| | | | 166/285 |
| 2016/0053597 A1* | 2/2016 | Brown | E21B 43/26 |
| | | | 166/250.1 |
| 2016/0215581 A1* | 7/2016 | Ingraham | E21B 43/26 |
| 2016/0237799 A1* | 8/2016 | Dawson | E21B 43/17 |
| 2016/0258264 A1* | 9/2016 | Lesko | E21B 17/20 |
| 2016/0326853 A1* | 11/2016 | Fredd | E21B 43/14 |
| 2017/0051594 A1* | 2/2017 | Dallas | E21B 43/16 |
| 2017/0175470 A1* | 6/2017 | Lesko | E21B 23/04 |
| 2017/0284181 A1* | 10/2017 | Ciezobka | E21B 43/267 |
| 2017/0335667 A1* | 11/2017 | Sargent | E21B 34/14 |
| 2018/0320479 A1* | 11/2018 | Wang | E21B 34/14 |
| 2018/0320499 A1* | 11/2018 | Dawson | E21B 43/126 |

* cited by examiner

RESERVOIR STIMULATION METHOD AND SYSTEM

TECHNICAL FIELD

The invention relates to a method and system for stimulating a hydrocarbon reservoir.

BACKGROUND

Stimulation, or hydraulic fracturing, of an onshore reservoir is used to increase production from the reservoir. The operation involves pumping a fracturing fluid at high pressure down a wellbore extending into the reservoir. The fluid puts pressure on the formation surrounding the wellbore, causing the formation to fracture.

The most common pad-fracturing operation deployed today uses plug-and-perf zipper methods, where two or more wells on a well pad are stimulated in a specific sequence to reduce downtime between frac stages and wireline trips. In this operation, one well is stimulated while simultaneously tripping into a nearby well on the pad with wireline to plug and isolate previously stimulated frac stages and perforate a new frac stage to be stimulated.

FIG. 1 shows a schematic diagram of the process of well pad stimulation in a zipper, plug-and-perf operation. The well pad contains four wells (2a, 2b, 2c and 2d). The surface equipment 4 includes water tanks 6, proppant tanks 8, blender 10 (containing a boost pump), high pressure pumps 12, pump manifold 14 and zipper manifold 16. Water and proppant (e.g. sand) are mixed in the blender 10 and the resulting slurry is fed to the pump manifold 14. The high pressure pumps 12 take slurry from the low pressure side of the manifold 14 and output slurry on the high pressure side. The slurry enters the zipper manifold 16 where it is diverted into the appropriate well 2a, i.e. the well which is currently being fractured. The well 2a that is being fractured has a frac stage with four perforation clusters 18. Simultaneously, another well 2c is being tripped into with wireline for plugging and perforating to prepare that well for the next frac stage. Once the wireline trip is completed, the well 2c is ready for fracturing.

Perforated frac stages consist of multiple perforation clusters (usually 4-12 clusters per stage), wherein each perforation cluster is designed to be a primary hydraulic fracture from the wellbore into the reservoir. Due to a variety of factors, poor distribution of fluid and proppant across the clusters within a frac stage is highly probable. Near wellbore diverters are used to reduce the degree of poor fluid and proppant distribution.

Simultaneous fracturing of neighbouring wells can be achieved by operating one frac crew and one wireline unit for each well. However, this process is expensive and requires larger pads to accommodate the stimulation equipment. The technique is not broadly used.

Pinpoint methods are used to provide a more even distribution of fluid and proppant, compared to multi-cluster frac stages. Most proven pinpoint methods require rigging coiled tubing or jointed tubing in hole while stimulating wells. These techniques are considered higher risk operations compared to plug-and-perf operations. Rigging and tubing in hole limits pad stimulation efficiencies.

There are pinpoint methods that do not require use of tubing in hole. Sleeves are permanently installed with the production liner or casing. Balls or collets are used to shift sleeves open to stimulate one fracture at a time and isolate previously stimulated stages.

One of the problems with existing stimulation methods is the need for wireline and crane units. Also, the entire slurry (fracturing fluid) volume has to go through the blender, the manifolds and the pumps. Having multiple perforation clusters (4-12) requires high fluid rates, resulting in high surface treating pressures. High treating pressures require more engineering controls to reduce the probability of HSE (health, safety and environmental) incidents. Higher treating pressures will generally also contribute to equipment failure and therefore necessitate more maintenance and increased non-productive time (NPT). Frac stages are designed to create several primary fractures simultaneously, likely resulting in uneven stimulation of the reservoir in the vicinity region of the well. Furthermore, sequencing stimulation from one well to the next, within a group of wells on a pad, results in non-productive time of the fracturing equipment.

SUMMARY OF INVENTION

The invention provides a method of stimulating a formation, and a system for stimulating a formation, as set out in the accompanying claims.

Preferred embodiments of the invention will now be described, by way of example only, with reference to the accompanying drawings.

DETAILED DESCRIPTION OF EMBODIMENTS

Embodiments of the invention provide a system and method for stimulating two or more wells simultaneously on a well pad level, for the purposes of increasing surface rates of fracturing fluid and proppant, decreasing surface treating pressure, and enhancing stimulation effectiveness in local regions of the reservoir.

By distributing the surface rates to multiple wells, wellbore friction (a large contributor to surface treating pressure) is reduced. This can be realized even at relatively high surface treating rates. By simultaneously generating multiple hydraulic sources from wells in the reservoir, fracture complexity within the reservoir may be enhanced. Fractures emanating from adjacent wells may interact to create more complex fracture networks in the formation. Single-point entry methods with sleeves will likely result in better fluid and proppant distribution along the horizontal section of the well and within the reservoir, ultimately leading to improved recovery.

In one embodiment, wells on a pad could be installed with sleeves that open one at a time such that one fracture in a well is stimulated individually (single-point entry or pinpoint). In addition to this, more than one well on a pad is stimulated simultaneously. Each sleeve is associated with one perforation cluster, which when stimulated creates one (single) primary fracture.

Other openings allowing fluid communication between the wellbore and the surrounding formation can also be used to stimulate a region of the wellbore. For example, a permanently installed casing may have sleeves with slots that can be selectively opened to allow stimulation fluid to flow through the slots and into the formation.

Figure 2:
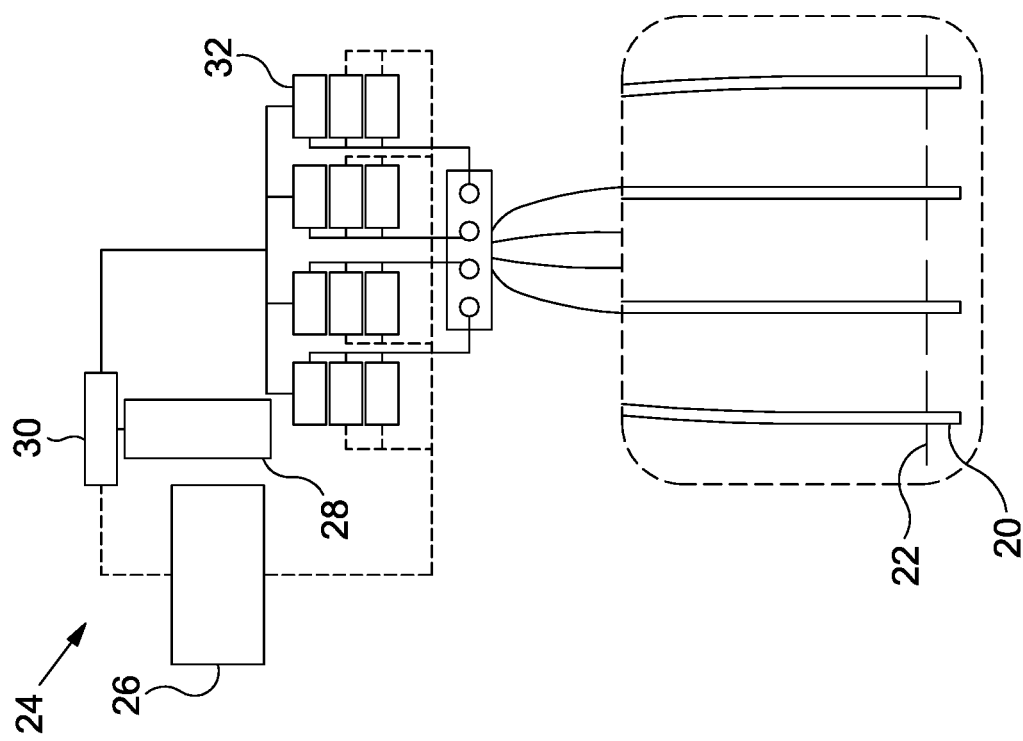
FIG. 2 is a schematic diagram of wellbore stimulation system according to an embodiment of the invention.
Figure 1:
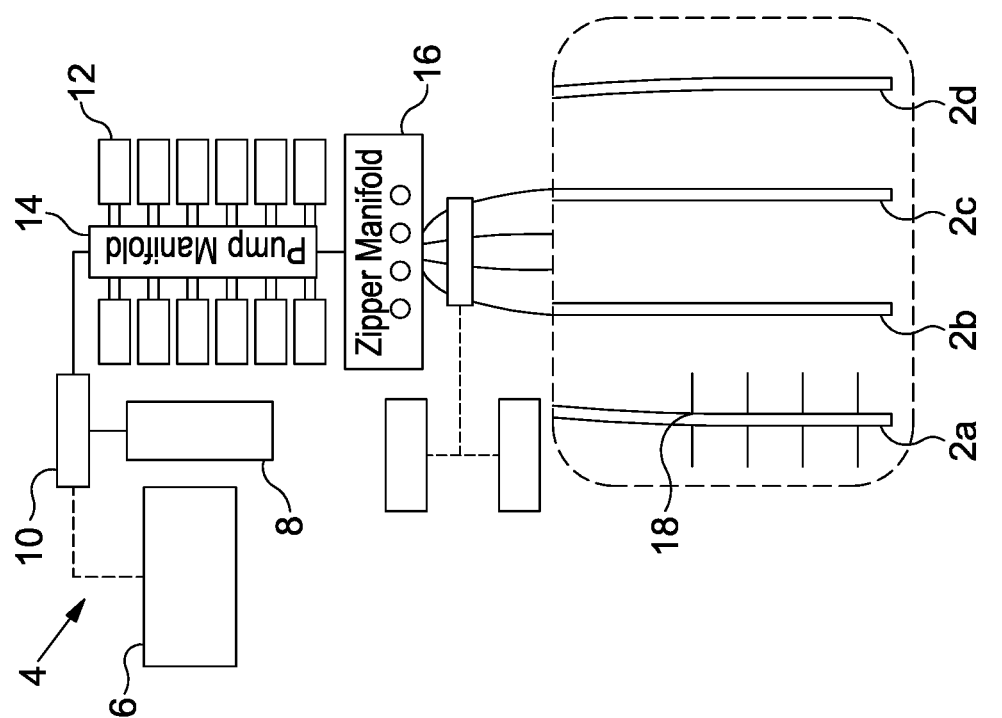
FIG. 1 is a schematic diagram of a prior art wellbore stimulation system.

FIG. 2 shows a schematic diagram of an embodiment, where single-point frac sleeves (not shown) can be used to simultaneously stimulate four wells 20 with one frac crew, where, in each well 20, one primary fracture 22 is being generated one at a time in each well. The surface equipment 24 includes water tanks 26, proppant tanks 28, blender 30, and high pressure pumps 32. Water and proppant (e.g. sand) are mixed in the blender 30 and the resulting slurry is fed to the pumps 32. There are four groups of high pressure pumps 32, each group feeding into one well 20. The slurry injected into the wells 20 is combined from two sources (split-flow fracturing): one concentrated slurry source from the blender 30 and one "clean" source (i.e., without proppant) directly from the water tanks 26. The high pressure pumps 32 are divided into two sets: one set pumping the concentrated slurry and one set pumping the clean fluid. Proppant is known to damage pumps, and split-flow fracturing may reduce the amount of maintenance required.

In another embodiment, two or more clusters or sleeves may be stimulated in each well during simultaneous stimulation of the wells. Because of the reduced wellbore friction, sufficiently high flow rates per cluster/sleeve can be achieved for more than one cluster/sleeve per stage.

Macromolecules, such as polymers or other chemicals, may be dissolved in the water in or before the blender. These macromolecules can improve proppant transport and lower the required surface treating pressures. The dissolved macromolecules can be used to cause gelling (increase viscosity) and/or to lower the friction in the system.

In this scenario, fluid and proppant distribution along a lateral and within the reservoir may be significantly improved. Additionally, since wellbore friction is significantly reduced, higher surface flow rates at lower surface treating pressures can be maintained. This arrangement will use much less fuel for the stimulation process and reduce the cost of equipment failure and maintenance significantly. For comparison, to stimulate a frac stage with four perforation clusters in a single well, using the conventional plug-and-perf zipper method, a surface flow rate of 70 bpm (barrels per minute) or 17.5 barrels per minute per cluster may be achieved with a surface treating pressure of 8000 psi. In the above described embodiment, on the other hand, a surface flow rate of 120 bpm (e.g. 30 bpm of fluid into each well) or 30 barrels per minute per sleeve can be achieved at only 5300 psi, because of the lower wellbore friction.

Figure 3:
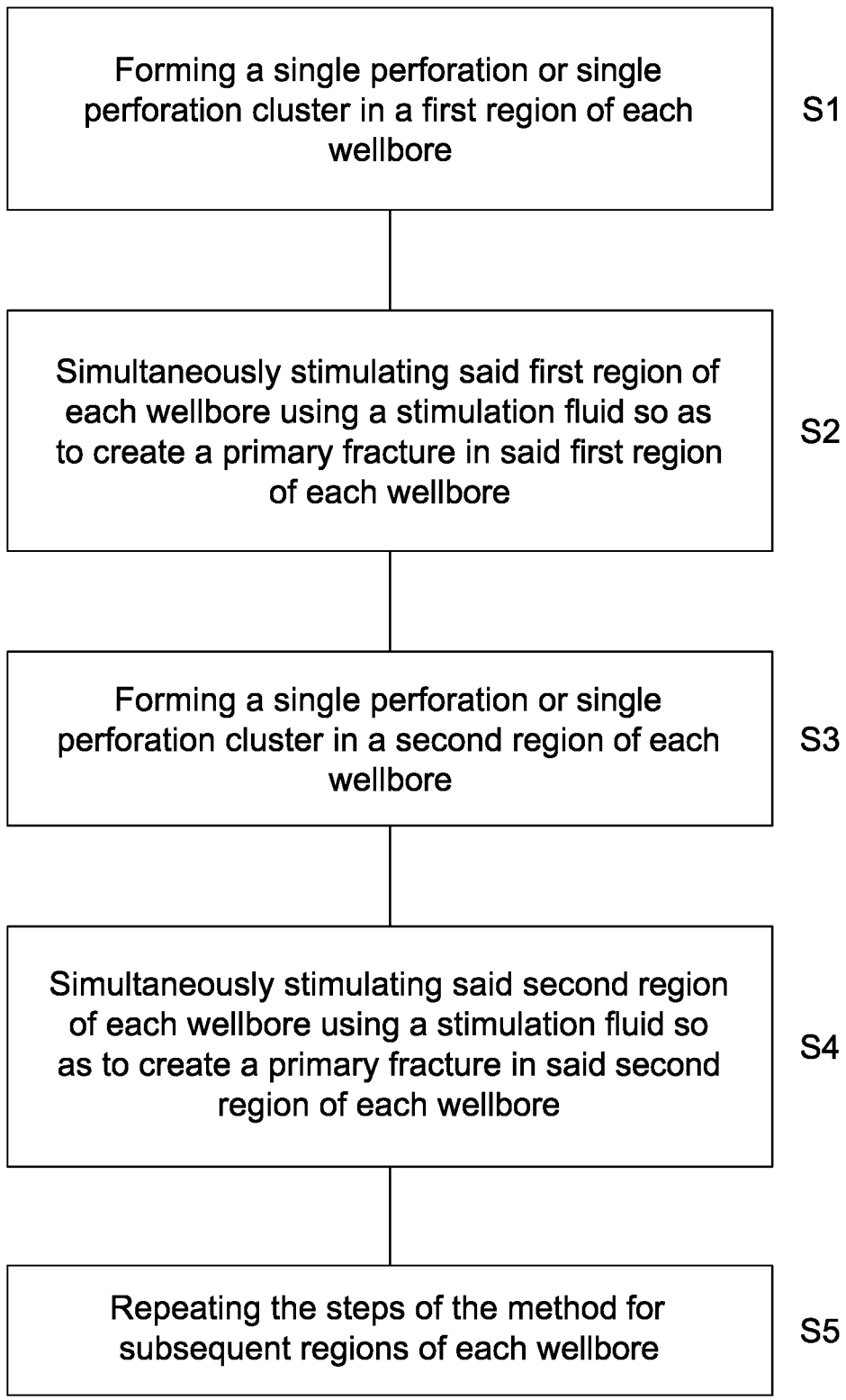
FIG. 3 is a flow chart of the steps of a method for stimulating a formation according to an embodiment of the invention.

FIG. 3 shows the steps of a method for stimulating the formation containing the wellbores according to an embodiment. In the first step a single perforation or single perforation cluster is formed in a first region of each wellbore S1. That is, the first frac stage is prepared for fracturing/stimulation, by perforating the casing or liner of the wellbore. It is in order to create a single primary fracture in each frac stage of any one wellbore that only one perforation (or one perforation cluster) is made in the first region. In the second step, the first region (frac stage) of each wellbore is simultaneously stimulated using a stimulation fluid so as to create a first primary fracture in the first region of each wellbore S2. The process is then repeated for the next frac stage in each well. This involves forming a single perforation or perforation cluster in a second region of each wellbore S3; simultaneously stimulating the second region of each wellbore using a stimulation fluid so as to create a primary fracture in the second region of each wellbore S4; and repeating the steps of the method for subsequent regions of each wellbore S5.

In certain embodiments for stimulating two or more wells simultaneously, the surface treating pressure may range from about 1,000 psi (pounds-force per square inch) to 12,000 psi. In certain embodiments, the surface treating pressure may range from about 1,000 psi to 8,000 psi. In certain embodiments, the surface treating pressure may range from about 1,000 psi to 6,000 psi.

In certain embodiments for stimulating two or more wells simultaneously, the flow rate per cluster (or sleeve) may range from about 5 bpm (barrels per minute) per cluster (or sleeve) to 150 bpm per cluster (or sleeve). In certain embodiments, the flow rate per cluster (or sleeve) may range from about 15 to 150 bpm per cluster (or sleeve). In certain embodiments, the flow rate per cluster (or sleeve) may range from about 25 bpm per cluster (or sleeve) to 150 bpm per cluster (or sleeve).

Another way of defining the flow rate is in terms of the flow rate per stimulated lateral length of the wellbore. The stimulated lateral length of a wellbore is defined as the distance between:
a) the most downstream fluid connection between that wellbore and the formation at which stimulation is taking place, and
b) the most upstream fluid connection between that wellbore and the formation at which stimulation is taking place.

For example, in a frac stage with multiple perforation clusters, the stimulated lateral length is the distance from the top of the most upstream cluster to the bottom of the most downstream cluster. If there is only one cluster in the stage, then the stimulated lateral length is the lateral distance from top to bottom of that cluster. If there is a single opening, i.e. a single fluid channel, then the stimulated lateral length is the lateral distance between the edges of that opening. In one embodiment, the flow rate in any one well of the multiple wells being simultaneously stimulated is greater than 1 bpm per foot of stimulated lateral length. In another embodiment, the flow rate in any one well of the multiple wells being simultaneously stimulated is greater than 2 bpm per foot of stimulated lateral length.

Figure 4:
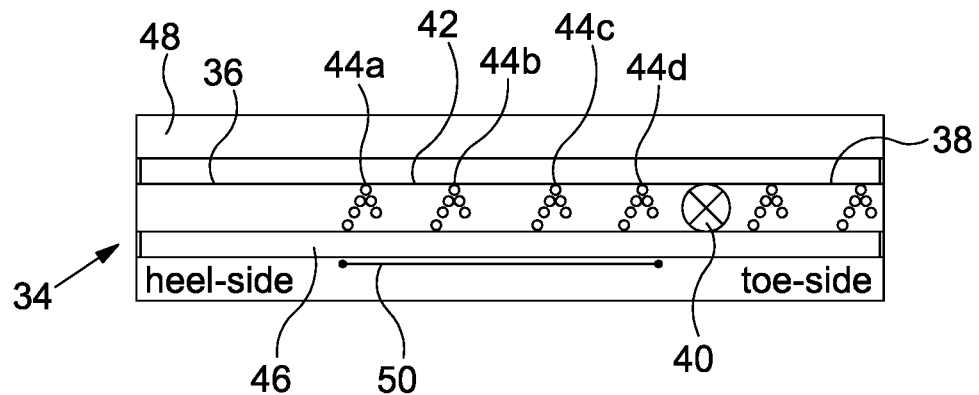
FIG. 4 is a schematic diagram of a section of a wellbore with a perforated wellbore casing.

FIG. 4 shows a section of a wellbore 34 with a perforated casing 36. A first region 38 (frac stage) has already been stimulated and is isolated by a plug 40. A second region 42 towards the heel (upstream) has been perforated with four perforation clusters 44a,b,c,d. The casing 36 is surrounded by cement 46, and the perforations 44a,b,c,d may extend through the cement 46. The stimulated lateral length 50 of this second region 42 is marked between the cluster 44a closest to the heel and the cluster closest to the toe 44d. As an example, if the flow rate into the wellbore is 70 bpm, and the stimulated lateral length 50 is 70 feet, then the flow rate is 17.5 bpm per cluster or 1 bpm per foot of stimulated lateral length.

Figure 5:
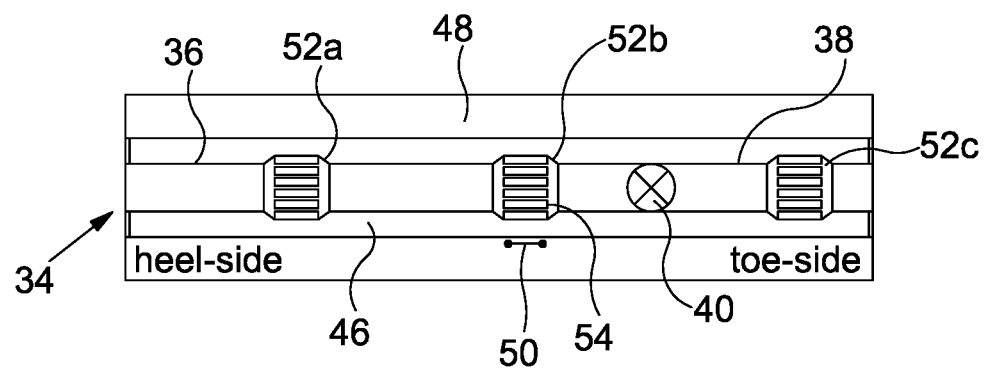
FIG. 5 is a schematic diagram of a section of a wellbore with a wellbore casing with sleeves.

FIG. 5 shows a section of a wellbore 34 with a casing 36 with permanently installed sleeves 52a,b,c with slots 54 to allow fluid communication between the wellbore 34 and the formation 48 when the sleeves 52a,b,c are open. A permanent sleeve 52c in the first region 38 has already been stimulated and is left open. A plug 40 isolates this stage/sleeve from the next sleeve 52b, which is currently being stimulated. A third permanent sleeve 52a upstream of the currently stimulated sleeve 52b is closed. The only fluid communication between the wellbore 34 and the formation 48 is through the slots 54 of the currently stimulated sleeve 52b, and the stimulated lateral length 50 is therefore equal to the lateral length of the slots 54.

In certain embodiments for stimulating two or more wells simultaneously, the flow rate per cluster (or sleeve) per 1,000 psi STP (surface treating pressure) may range from about 1 bpm (barrels per minute) per cluster (or sleeve) per 1,000 psi STP to 40 bpm per cluster (or sleeve) per 1,000 psi STP. In certain embodiments, the flow rate per cluster (or sleeve) per 1,000 psi STP (surface treating pressure) may range from about 3 bpm (barrels per minute) per cluster (or sleeve) per 1,000 psi STP to 40 bpm per cluster (or sleeve) per 1,000 psi STP. In certain embodiments, the flow rate per cluster (or sleeve) per 1,000 psi STP (surface treating pressure) may range from about 5 bpm (barrels per minute) per cluster (or sleeve) per 1,000 psi STP to 40 bpm per cluster (or sleeve) per 1,000 psi STP. In certain embodiments, the flow rate per cluster (or sleeve) per 1,000 psi STP (surface treating pressure) may range from about 8 bpm (barrels per minute) per cluster (or sleeve) per 1,000 psi STP to 40 bpm per cluster (or sleeve) per 1,000 psi STP.

In many cases it may be desirable to deliver the most hydraulic horsepower possible to the perforation clusters. The horsepower is proportional to the product of bottom-hole flowing pressure (BHFP) and to flow rate through perforation clusters or sleeves. Bottom-hole flowing pressure is mostly determined by formation properties (e.g., depth and pore pressure) and usually ranges from 5,000 psi to 15,000 psi for virgin reservoirs, and from 2,000 psi to 8,000 psi for appreciably depleted reservoirs. For a wellbore in a given reservoir, BHFP usually does not vary by more than 10% (e.g., from 100 psi to 1500 psi). For this reason, perforation flow rate can be adjusted to maximize hydraulic horsepower to perforation clusters or sleeves. To maximize hydraulic horsepower to perforation clusters or sleeves, surface flow rate should be maximized. In multi-cluster fracturing applications, the surface flow rate will be distributed over multiple clusters thereby distributing horsepower over multiple clusters. In an example of a single well with four perforation clusters, a surface rate of 70 bpm is distributed over the four clusters for an average of 17.5 bpm/cluster. For multi-cluster applications including zipper PnP and in prior simultaneous fracturing applications, the cluster average flow usually spans from 4 to 20 bpm/cluster. In the above described embodiment, where multi-well stimulation is applied, the surface flow rate is 120 bpm and the average flow rate is 30 bpm/sleeve. Additionally, the surface treating pressure is 5300 psi, nearly 3000 psi below that in the PnP example. While the surface treating pressure is lower in the above described embodiment (than the example for multi-cluster applications), the average horsepower delivered to the formation at the sleeve or cluster is higher. Surface treating pressures depend on BHFP, wellbore properties (e.g., length and diameter of casing/liner strings) and slurry properties (e.g., density and friction properties), and usually ranges from 6000 to 12,000 psi for virgin reservoirs, and ranges from 3,000 to 8,000 in appreciably depleted reservoirs. Maximum attainable surface treating pressures depend on wellbore properties (e.g., burst pressure rating of exposed casing/liner strings, length and diameter of casing/liner strings), and maximum attainable surface treating pressures is considered during the wellbore design process.

A perforation cluster is a dense group of holes through casing/liner (and cement in some cases) spanning a section of the wellbore within a reservoir of interest, where fluid connection is established between the formation/reservoir and the wellbore. In simple terms, one dominate hydraulic fracture (or primary fracture) is created from a perforation cluster. Typical perforation clusters used in industry consist of 6 holes spanning 1 foot of wellbore or 12 holes spanning 2 feet of wellbore. The hole diameter is usually between 0.25 to 0.5 inches. Often, holes are evenly distributed axially and radially along the section of wellbore. In some cases, perforation clusters may consist of less than 6 holes, and in rare cases a perforation cluster could be one hole. In most cases, perforation clusters span 2 feet or less of wellbore, but in rare cases perforation clusters may span more than 2 feet but not more than 10 feet. Distances between perforation clusters are usually 25 to 65 ft, but in rare cases the distance can be as high as 100 feet or more or as low as 10 feet.

Figure 6:
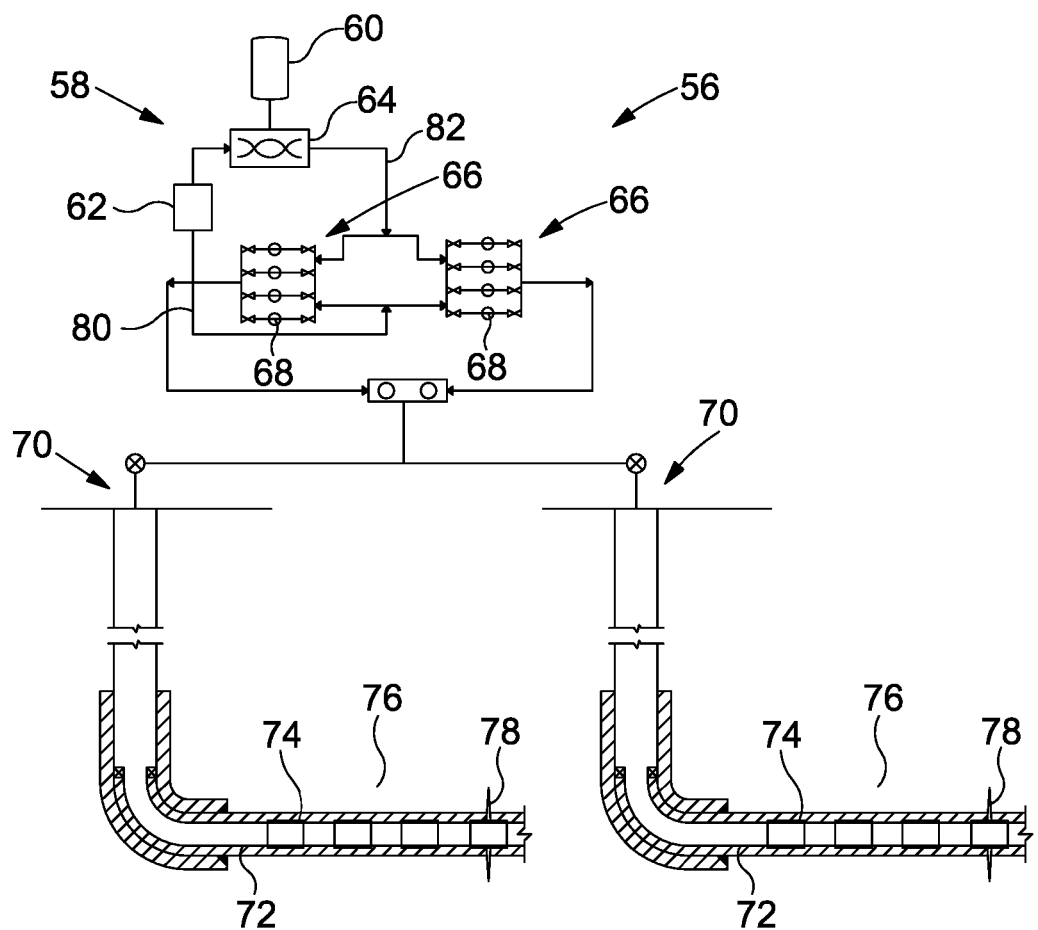
FIG. 6 is a schematic diagram of a system for multi-well stimulation according to an embodiment.

FIG. 6 shows a system 56 according to an embodiment. The system comprises a frac crew 58 (or surface fracturing equipment 58) with a proppant tank 60, a fluid tank 62, a blender 64, two pumping units 66 with four high pressure pumps 68 each. The system also comprises two wellbores 70, each connected to the surface fracturing equipment 58 to allow simultaneous stimulation as described herein. The wellbores 70 comprise casing 72 and permanently installed sleeves 74. Each sleeve 74 may be opened in turn to allow fluid communication between the wellbore 70 and the surrounding formation 76. A single sleeve in each well 70 is open during stimulation, so as to create a single primary fracture 78 in each well. The pumping units 66 have a clean side 80 from the water tank 62, and a slurry side 82 from the blender 64. Some of the high pressure pumps 68 in each pumping unit 66 are dedicated to pumping only water and are fed from the clean side 80. The other high pressure pumps 68 are fed from the slurry side 82. The slurry and the water are pumped simultaneously into each wellbore 70, but the flow rate into each well 70 can be individually controlled.

In another embodiment, each region (frac stage) may be perforated in advance, before starting the stimulation. In this case, the stage that is currently being fractured in a given well is isolated from all other stages. This is achieved by using appropriate downhole fracturing apparatus. For example, a temporary fracturing device such as the reservoir stimulation tool described herein may be used.

An added benefit of using multi-well stimulation, as shown in FIG. 2, is that fewer facilities and less maintenance is required. In multi-well stimulation, wireline and crane units may not be needed. The split flow allows the blender 30 to run at a lower rate, allowing for lower maintenance and better control. In other embodiments, the flow may not be split (i.e. no clean side). Additionally, pumps 32 can be arranged more efficiently. In this example, a group of pumps 32 is dedicated to a specific well 20, so that the flow rate in each well 20 can be controlled independently, even if the wells 20 have appreciable differences in surface treating pressure. Pumps 32 can also be specifically dedicated to pump fluid without proppant or fluid with proppant, allowing for lower required maintenance for all the pumps 32. With lower treating pressures, the pumps 32 can handle higher flow rates. In some circumstances it may be necessary to flush a well (e.g. due to clogging and trapped sand in the perforations) by only pumping water (and no slurry) into that well. In this case, all the pumps pumping slurry into that well can be turned off, so that only the clean side is operating for that well. Meanwhile, slurry may still be pumped into any other well in order to reduce NPT.

Hence it is seen that various embodiments of the invention may provide one or more of the following contributions: A combination of single-point frac sleeves with simultaneously fracturing operations on a well pad; a method of increasing surface treating rates while decreasing surface treating pressures for fracturing operations on a well pad; a method that may reduce pumping equipment failure and maintenance; a method of introducing multiple and independent hydraulic sources at precise locations in the reservoir to enhance the fractured surface area; and a method to improve fluid and proppant distribution evenly along the well, allowing for better well stacking in leases/sections.

Having described methods of simultaneously stimulating multiple wells, we will now describe reservoir stimulation tools which may be used in the methods described or in other methods.

We describe embodiments which provide a new temporary fracturing completion system that may reduce the operational risks that are associated with traditional completion methods, reduce well costs, and increase production recovery of low productivity wells. The embodiments may enable control of the design of the fractures and of the distribution of the fluid along the wellbore.

Figure 7:
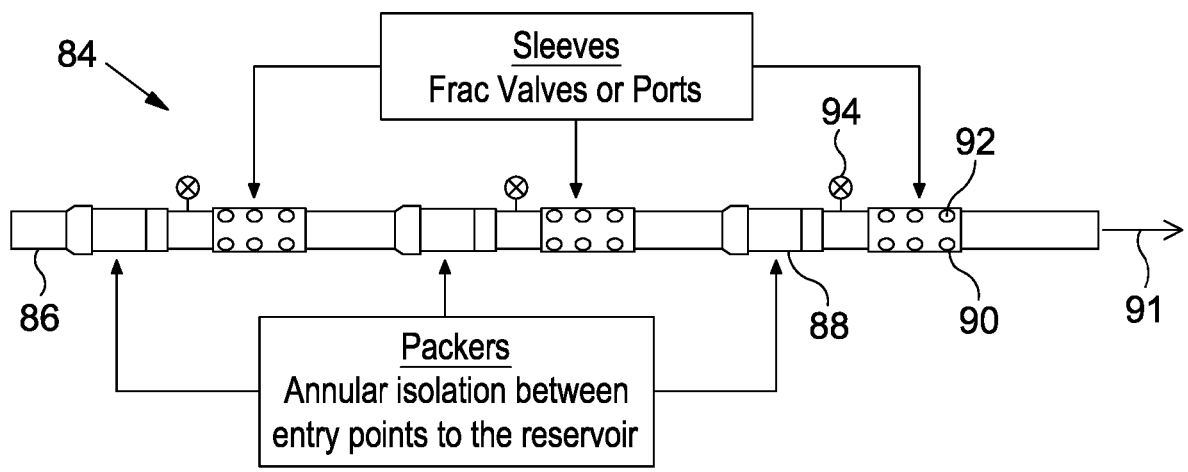
FIG. 7 is a schematic diagram of a section of a temporary fracturing tool.

FIG. 7 shows an embodiment of the reservoir stimulation tool 84 (also referred to as "Direct Access Reservoir Tool" and "the tool"). The tool 84 consists of multiple tubular sections, which form a tubular string 86. Only a part of the string 86 is shown in FIG. 7. The tool 84 has a plurality of packers 88 and sleeves 90 coupled to the string 86. The packers 88 are spaced apart along the longitudinal axis 91 of the string 86 with one sleeve 90 between any two adjacent packers 88. The packers 88 are expandable to engage the inner wall of the wellbore casing (not shown). Each sleeve 90 can be individually actuated to open a port 92 in the tubular string 86. The ports 92 allow fracturing fluid to flow from the tubular string out into the annulus between the string 86 and the wellbore. Each port 92 may comprise multiple fluid channels/holes. The tool also comprises a sensor unit 94 associated with each section of the string 86. Each sensor unit 94 may comprise one or more sensors (not shown) that are configured to measure one or more properties of a wellbore fluid.

The overall length of the tool can be chosen to correspond to the length of wellbore that is to be stimulated. This allows stimulation of the entire well without having to move or withdraw the tool. This in turn allows the fracturing operation to be carried out without a rig or coiled tubing during the stimulation process, as there is no need to move the tool from one frac stage to the next.

The packers can be set at the same time mechanically, hydraulically or electrically and retrieved either mechanically by upward pulling or electrically. The packers may be configured to release when experiencing a pulling force via the tubular string. For example, the packers may comprise shearing pins, which break when experiencing a sufficiently large shearing force. This allows the tool to be easily extracted (run out) after completion.

Each port in the reservoir stimulation tool is controlled by a port valve, wherein the above described sleeve is one example of such a port valve. A port valve, in this context, includes any mechanism for opening and closing a port.

The tool may be equipped with devices (such as the sensor units 94) to monitor the well during stimulation and/or production. For example, the tool could include sensors for measuring temperature, pressure, flow rates, gas to oil ratio (GOR), water to oil ratio (WOR) etc. Some data may be stored at the tool during stimulation and/or production, in order to be recovered for analysis at the surface after the tool has been run out of the well. In other cases the data can be relayed to surface in real time. Having one monitoring device (or sensor unit) in each section of the tool (i.e. associated with each port) enables zonal analysis during stimulation and/or production.

After a stage has been fractured it has to be isolated from the next stage to be completed. In one embodiment, the completed frac stage is isolated by shifting the sleeve back to its closed position. That is, the sleeve is configured to be actuated again to close the associated port, and hence prevent fluid communication between the completed stage and the inner bore of the tool. An advantage of such a system is the ability to frac any number of stages in any desired order, with individual frac isolation. Alternatively, the tool may comprise isolation valves (e.g. a baffle with a ball seat) in the inner bore associated with each sleeve. Each isolation valve is arranged downstream of the associated port, so that when the isolation valve is closed the string below the port is isolated. In this embodiment each frac stage has to be completed in order, starting with the lowermost stage (at the toe).

In one embodiment, the tool has well-matched dimensions and pressure ratings for a 15 kpsi reservoir. The tool may be designed to run inside 5½" and/or 4½" production casing. The sleeves and valves may be operated mechanically (e.g. hydraulically) or electrically, and may be designed so that they cannot be opened or closed accidentally. The tool can be configured to be compatible with CO2-hybrid fracturing design.

Figure 8:
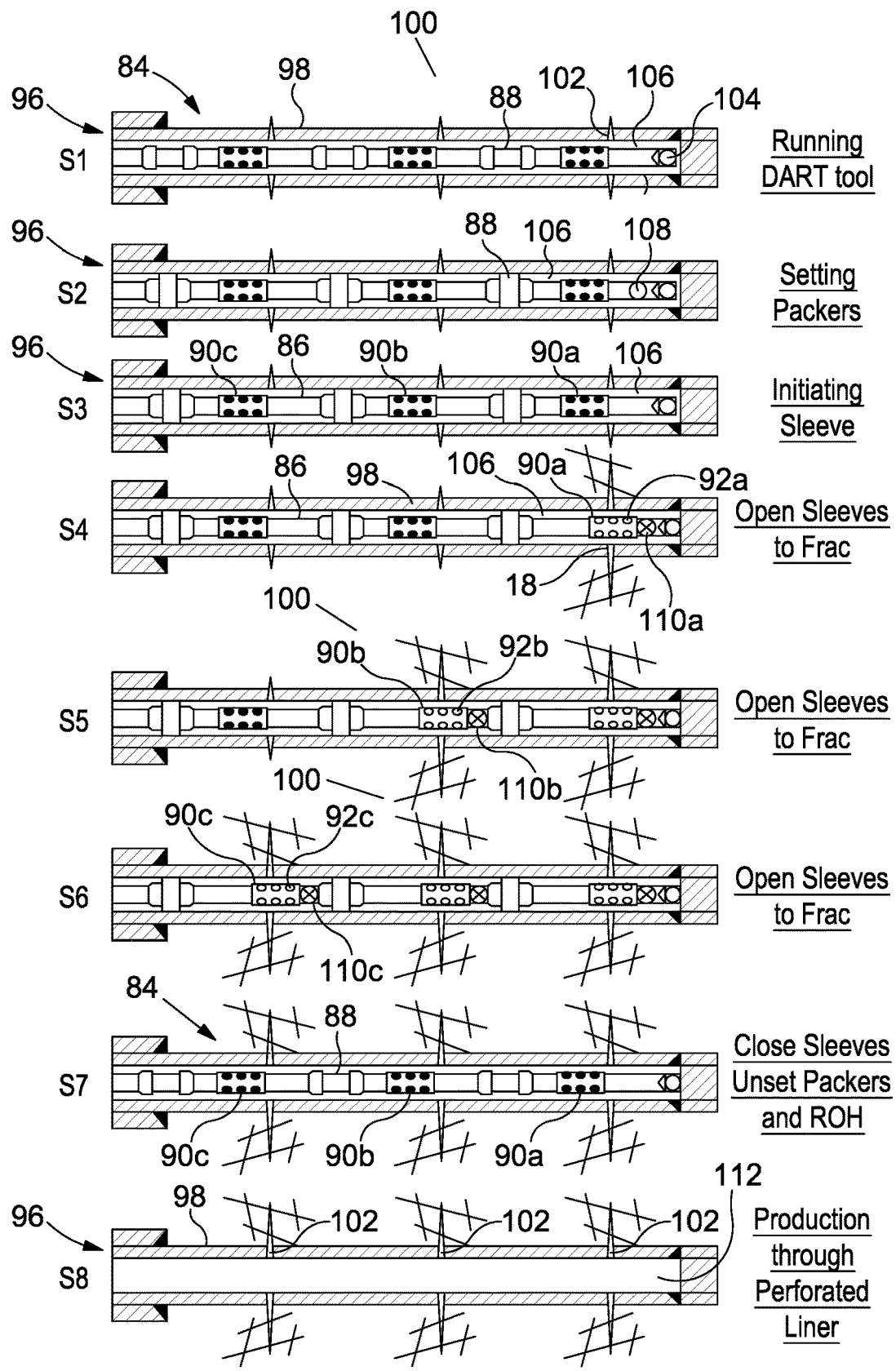
FIG. 8 is a series of schematic diagrams showing the steps of using a temporary fracturing tool.

FIG. 8 illustrates the steps of a fracturing operation using an embodiment of the reservoir stimulation tool 1. In step S1 the tool 84 has been inserted into the wellbore 96. The liner 98 of the wellbore 96 has previously been perforated to allow fracturing fluid to enter the formation 100. The tool 84 is positioned axially such that there is one perforation 102 (or perforation cluster 102) located between any two packers 88. A type of valve 104 is installed at the bottom of the tool 84 which allows fluid to flow from the tool 84 to the annulus 106 for circulation, but the opposite flow direction is restricted (no fluid can flow from the wellbore into the tool). In step S2, a dissolvable ball plug 108 is pumped into the well 96 to allow the inner pressure to build up in order to set the packers 88. The packers 88 are hydraulically expanded/set to lock the tool 84 in place. The expanded packers 88 prevent fluid flow in the annulus 106, between the string 86 and the wellbore 96, between frac stages. In step S3, the ball plug 108 has dissolved to establish fluid flow from the inner string 86 to the annulus 106. This enables mechanical devices (i.e collets and balls) to be pumped down to activate sleeves 90a,b,c in the string 86 and set isolation valves 110. In step S4, the first sleeve 90a, closest to the toe of the well, is actuated to open the first port 92a. A dissolvable ball (not shown) is set in place to close an isolation valve 110a and direct fluid to flow through the port 92a. Fracturing fluid is pumped down the tubular string 86 and enters the annulus 106 between the string 86 and the wellbore 96 through the port 92a. The fracturing fluid then enters the formation via the perforations 102 in the liner 98 in the first frac stage, causing the formation 100 to fracture. In step S5, the next sleeve 90b is actuated to open the second port 92b. A dissolvable ball is set in place to isolate the first frac stage from the second frac stage by closing an isolation valve 110b. Fracturing fluid is again pumped down through the tool 84 and out of the second port 92b to fracture the formation 100 at the second frac stage. In step S6, the third sleeve 90c is actuated to open the third port 92c. A valve 110c is closed to isolate the third stage from the previous two completed stages, and the third stage is then fractured. In step, S7 all the ports 92a,b,c are closed by shifting the sleeves 90a,b,c back to their original positions and all isolation ball type valves 110a,b,c are removed/dissolved. The packers 88 are released by applying a pulling force to the tool 84. In step S8, the tool has been run out of the wellbore and production fluid 112 flows through the perforations 102 in the liner 98 and into the wellbore 96.

Figure 9:
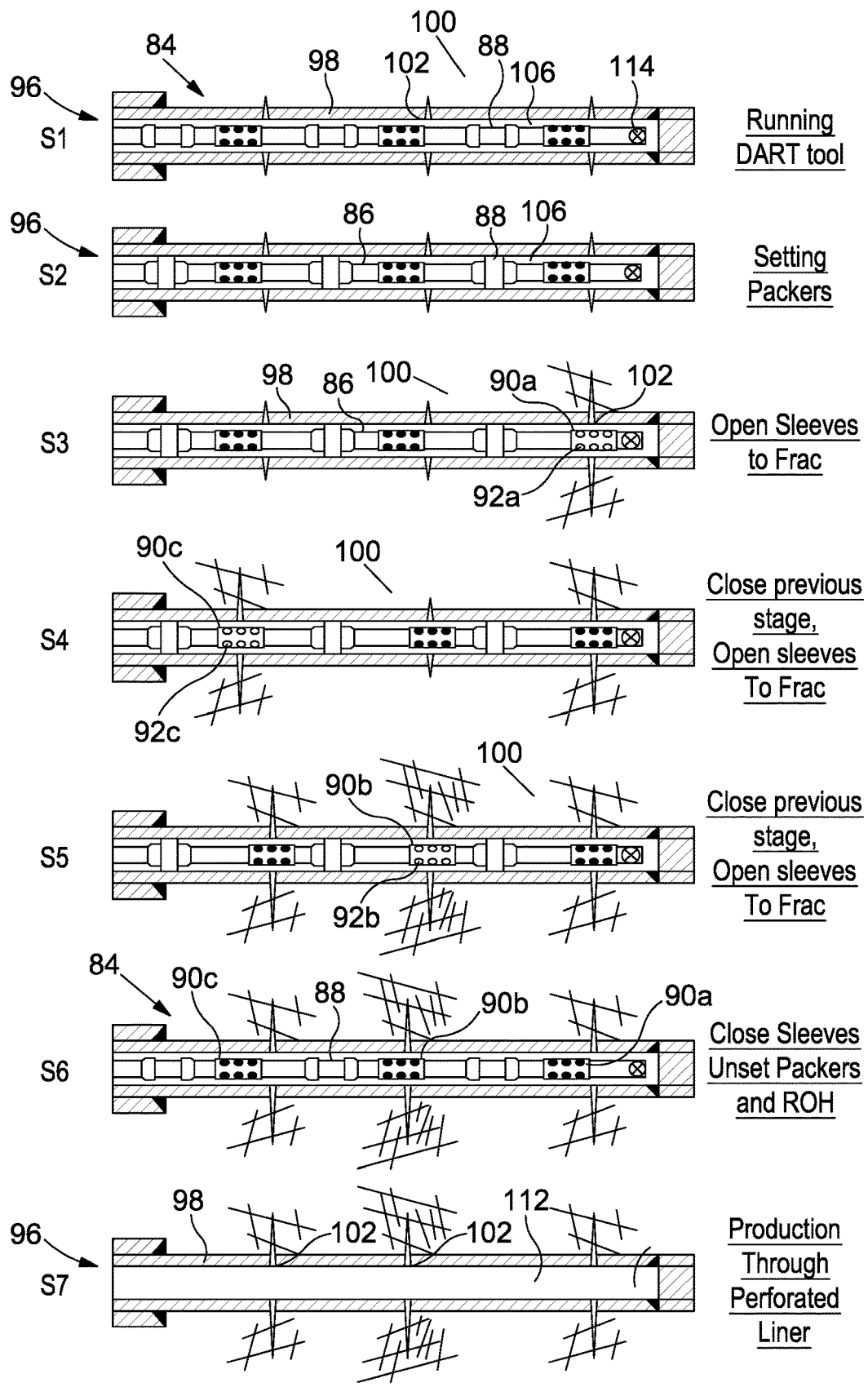
FIG. 9 is a series of schematic diagrams showing the steps of an alternative way of using a temporary fracturing tool.

FIG. 9 illustrates the steps of a fracturing operation using an embodiment of the reservoir stimulation tool, in which the sleeves and packers are activated electrically, and can be activated out of sequence. That is, stimulation does not need to occur in sequence from toe to heel as in FIG. 8. Fracturing out of sequence may enable better stimulation due to stress shadow effects from previously stimulated regions. In step S1 the tool 84 is inserted into the wellbore 96. The liner 98 of the wellbore 96 has previously been perforated to allow fracturing fluid to enter the formation 100. The tool 84 is positioned axially such that there is one perforation (or perforation cluster) 102 located between any two packers 88. The tool is isolated from the annulus 106 with a valve 114 at the bottom, so fluids cannot flow from the wellbore 96 into the tool 84. In step S2, the packers 88 are expanded/set to lock the tool 84 in place. The expanded packers 88 prevent fluid flow in the annulus 106, between the string 86 and the wellbore 96, between frac stages. In step S3, a first sleeve 90a, closest to the toe of the well, is actuated to open the first port 92a. Fracturing fluid is pumped down the tubular string 86 and enters the annulus 106 between the string 86 and the wellbore 96 through the port 92a. The fracturing fluid then enters the formation 100 via the perforations 102 in the liner 98 in the first frac stage, causing the formation 100 to fracture. In step S4, the third sleeve 90c is actuated to open the third port 92c, while the previous sleeve 90a with port 92a are closed to isolate the first frac stage. Fracturing fluid is again pumped down through the tool 84 and out of the third port 92c to fracture the formation 100 at the third frac stage. In step S5, the second sleeve 90b is actuated to open the second port 92b, and the port 92c from the previous stimulated sleeve 90c is closed to isolate the second stage from the previous two completed stages, and the second stage is then fractured. In step, S6 all the ports 92a,b,c are closed, by shifting all sleeves 90a,b,c back to their original positions. All packers 88 are released electrically. In step S7, the tool 84 has been run out of the wellbore 96 and production fluid 112 flows through the perforations 102 in the liner 98 and into the wellbore 12.

In another embodiment, the reservoir stimulation tool may be used to stimulate the well without hydraulic fracturing. For example, the tool may be used for matrix stimulation. Instead of pumping fracturing fluid down the tool at high pressure, a different stimulation fluid can be injected at a pressure below that of the fracturing pressure of the formation. Steam or acid or carbon dioxide or nitrogen or natural gas or natural gas liquids may be injected in this way in order to stimulate the formation.

Primary Recovery

In general, the installation procedure consists of: Running the tool into the well for the fracturing operation after the well has been cased and perforated; set the packers all at the same time; and with the single point entry stimulate the well by stages. Hence there is provided, a pinpoint stimulation method to fracture, stimulate, and clean out the well with a single trip. There is no need of leaving expensive sleeves in the well (permanent completion) or using expensive rigs or coiled tubing during the stimulation operation.

For production, the tool can be removed, to be used to stimulate other wells. After running the tool out of the well, the valves and packers are reconditioned before running the tool in a second well. For example, if the packers comprise shearing pins to facilitate their release after completion, these would have to be replaced. The length of the tool may also be adjusted before re-using it.

Alternatively, the tool can stay in the well for zonal production control and/or analysis. That is, after completion the tool may be left in the well with the packers expanded. The sleeves are then used to open and close ports in order to achieve zonal control or zonal analysis.

In one embodiment, multiple wells on a pad could be installed with sleeves that open one at a time such that one fracture in each well is stimulated one at a time, while more than one well on the well pad are stimulated simultaneously. Single-point frac sleeves can be used to simultaneously stimulate multiple wells, where in each well one primary fracture is being generated one at a time. In this scenario, fluid and proppant distribution along the lateral and within the reservoir should be significantly improved.

Secondary Recovery (Re-Stimulation of Existing Wells)

Existing wells, which have previously been fractured, can be stimulated again to increase production. The reservoir stimulation tool can be used both for stimulating low productivity wells and for re-fracturing old wells with declined production. The tool may be used for re-fracturing, huff and puff and/or flooding. The tool allows for control of injection and/or production in segments of the well during secondary recovery applications.

In one embodiment, the tool may also be used to re-stimulate under-performing zones.

The fracturing fluid is pumped from the top of the wellbore downstream towards the reservoir. Therefore, in this specification the term "downstream" is used to refer to the direction from the top of the wellbore (i.e. the surface) down towards the reservoir.

Each feature disclosed or illustrated in the present specification may be incorporated in the invention, whether alone or in any appropriate combination with any other feature disclosed or illustrated herein.

The invention claimed is:

1. A method of stimulating a formation comprising two or more wellbores, said method comprising:
   simultaneously stimulating a first region of each wellbore by injecting a stimulation fluid so as to only create a single primary fracture in said first region of each wellbore, wherein said first region comprises a first opening or openings allowing fluid communication between each wellbore and said formation, wherein said first region has a first stimulated lateral length and wherein an injection flow rate of said stimulation fluid through said first opening or openings is greater than 1 barrel per minute per foot of said first stimulated lateral length,
   wherein said stimulation fluid comprises water without dissolved macromolecules.

2. The method according to claim 1, wherein said first stimulated lateral length in any one of said two or more wellbores is the distance between:
   a) the most downstream fluid connection between that wellbore and the formation at which stimulation is taking place, and
   b) the most upstream fluid connection between that wellbore and the formation at which stimulation is taking place.

3. The method according to claim 1, wherein the injection flow rate of said stimulation fluid through said first opening or openings is greater than 5 barrels per minute (bpm) per opening, or preferably greater than 15 bpm per opening, or more preferably greater than 25 bpm per opening.

4. The method according to claim 1, wherein the injection flow rate of said stimulation fluid through said first opening or openings is greater than 1 barrel per minute (bpm) per opening per 1000 psi of surface treating pressure (STP), or preferably greater than 3 bpm per opening per 1000 psi of STP, or more preferably greater than 4 bpm per opening per 1000 psi of STP.

5. The method according to claim 1, wherein said first opening or opening is one opening, which is the only one opening in said first region.

6. The method according to claim 1, wherein said first opening is formed from a perforation, a perforation cluster or a slot.

7. The method according to claim 1, wherein said first openings are formed from perforations, perforation clusters or a number of slots.

8. The method as claimed in claim 1, further comprising: simultaneously stimulating a second region of each wellbore using a stimulation fluid so as to create a primary fracture in said second region of each wellbore, wherein said second region comprises a second opening or openings allowing fluid communication between each wellbore and said formation, wherein said second region has a second stimulated lateral length and wherein the injection flow rate of said stimulation fluid through said second opening or openings is greater than 1 barrel per minute per foot of said second stimulated lateral length.

9. The method according to claim 8, wherein said second stimulated lateral length in any one of said two or more wellbores is the distance between:
   a) the most downstream fluid connection between that wellbore and the formation at which stimulation is taking place during stimulation of said second region, and
   b) the most upstream fluid connection between that wellbore and the formation at which stimulation is taking place during stimulation of said second region.

10. The method according to claim 8, wherein the infection flow rate of said stimulation fluid through said second opening or openings is greater than 5 barrels per minute (bpm) per opening, or preferably greater than 15 bpm per opening, or more preferably greater than 25 bpm per opening.

11. The method according to claim 8, wherein the injection flow rate of said stimulation fluid through said second opening or openings is greater than 1 barrel per minute (bpm) per opening per 1000 psi of surface treating pressure (STP), or preferably greater than 3 bpm per opening per 1000 psi of STP, or more preferably greater than 4 bpm per opening per 1000 psi of STP.

12. The method according to claim 1, wherein said second opening or openings is one opening, which is the only one opening in said second region.

13. The method according to claim 8, wherein during said simultaneous stimulation of said second region of each wellbore, only one primary fracture is created in said second region of each wellbore.

14. The method according to claim 8, which further comprises repeating the steps of the method for subsequent regions of each wellbore.

15. The method according to claim 1, further comprising providing a fracturing apparatus in each well, prior to said step of simultaneously stimulating the first region in each well.

16. The method according to claim 15, wherein said fracturing apparatus comprises single entry or pin-point fracturing equipment.

17. The method according to claim 1, wherein said step of stimulating comprises pumping with one or more high pressure pumps the stimulation fluid into each well.

18. The method according to claim 17, wherein said step of pumping has an associated surface treating pressure, and said surface treating pressure is within the range 1000 psi to 12000 psi, or preferably within the range 1000 psi to 8000 psi, or more preferably within the range 1000 psi to 6000 psi.

19. The method according to claim 17, when pumping with at least two high pressure pumps, wherein said high pressure pumps are divided into a first and a second group of pumps, and said first group of pumps is configured to pump a slurry comprising water and proppant into each well, and said second group of pumps is configured to pump water without proppant into each well.

20. The method according to claim 1, wherein the injection flow rate of the stimulation fluid is controlled separately for each individual well.

21. The method according to claim 1, wherein the stimulation fluid further comprises one or more of water mixed with proppant, carbon dioxide, nitrogen, natural gas, natural gas liquids, and crude.

22. The method according to claim 1, performed with a single set of surface fracturing equipment, said set comprising:
   one or more water tanks;
   one or more proppant tanks;
   a blender for mixing water from the one or more water tanks and proppant from one or more proppant tanks to form said stimulation fluid; and
   a single pumping unit comprising one or more high pressure pumps.

23. The method according to claim 22, wherein said blender is a single blender, such that the surface fracturing equipment comprises only one blender.

24. The method as claimed in claim 1, wherein each wellbore contains a wellbore casing or liner, and each of said first opening or openings is formed in said wellbore casing or liner.

25. The method according to claim 1 and comprising forming the first opening or openings in said first region of each wellbore.

26. A system for stimulating a formation comprising two or more wellbores, said system comprising:
   surface fracturing equipment, arranged to stimulate said wellbores simultaneously by injecting a stimulation fluid; and
   a fracturing apparatus located in each well, wherein said fracturing apparatus is configured to stimulate a first region of each wellbore in order to only create a single primary fracture in said first region, wherein said first region comprises a first opening or openings allowing fluid communication between each wellbore and said formation, wherein said first region has a stimulated lateral length and wherein an injection flow rate of said stimulation fluid through said first opening or openings is greater than 1 barrel per minute per foot of said stimulated lateral length, wherein said stimulation fluid comprises water without dissolved macromolecules.

27. The system according to claim 26, wherein the fracturing apparatus is further configured to stimulate a second region of each wellbore in order to create a primary fracture in said second region.

28. The system according to claim 26, wherein the fracturing apparatus comprises single entry or pin-point fracturing equipment.

29. The system according to claim 26, wherein the fracturing apparatus comprises permanently installed casing sleeves or a temporary fracturing tool.

30. The system according to claim 27, wherein each of the regions forms a frac stage, and the fracturing apparatus is configured to allow fluid flow into one frac stage while isolating all other frac stages from the stimulation fluid.

31. The system according to claim 26, wherein the surface fracturing equipment comprises one or more water tanks; one or more proppant tanks; a blender; and a pumping unit comprising one or more high pressure pumps;

wherein the blender is configured to mix water from the one or more water tanks and proppant from the one or more proppant tanks to form said stimulation fluid, and said pumping unit is configured to pump the stimulation fluid into each wellbore in order to simultaneously stimulate said wellbores.

32. The system according to claim 31, wherein the pumping unit comprises one high pressure pump or one group of high pressure pumps connected to each individual wellbore.

33. The system according to claim 31, wherein said blender is a single blender, such that the surface fracturing equipment comprises only one blender.

* * * * *